Jan. 8, 1952 L. H. MOOMAW ET AL 2,581,691
PHOTOGRAPHIC CAMERA
Filed Aug. 19, 1946 2 SHEETS—SHEET 1
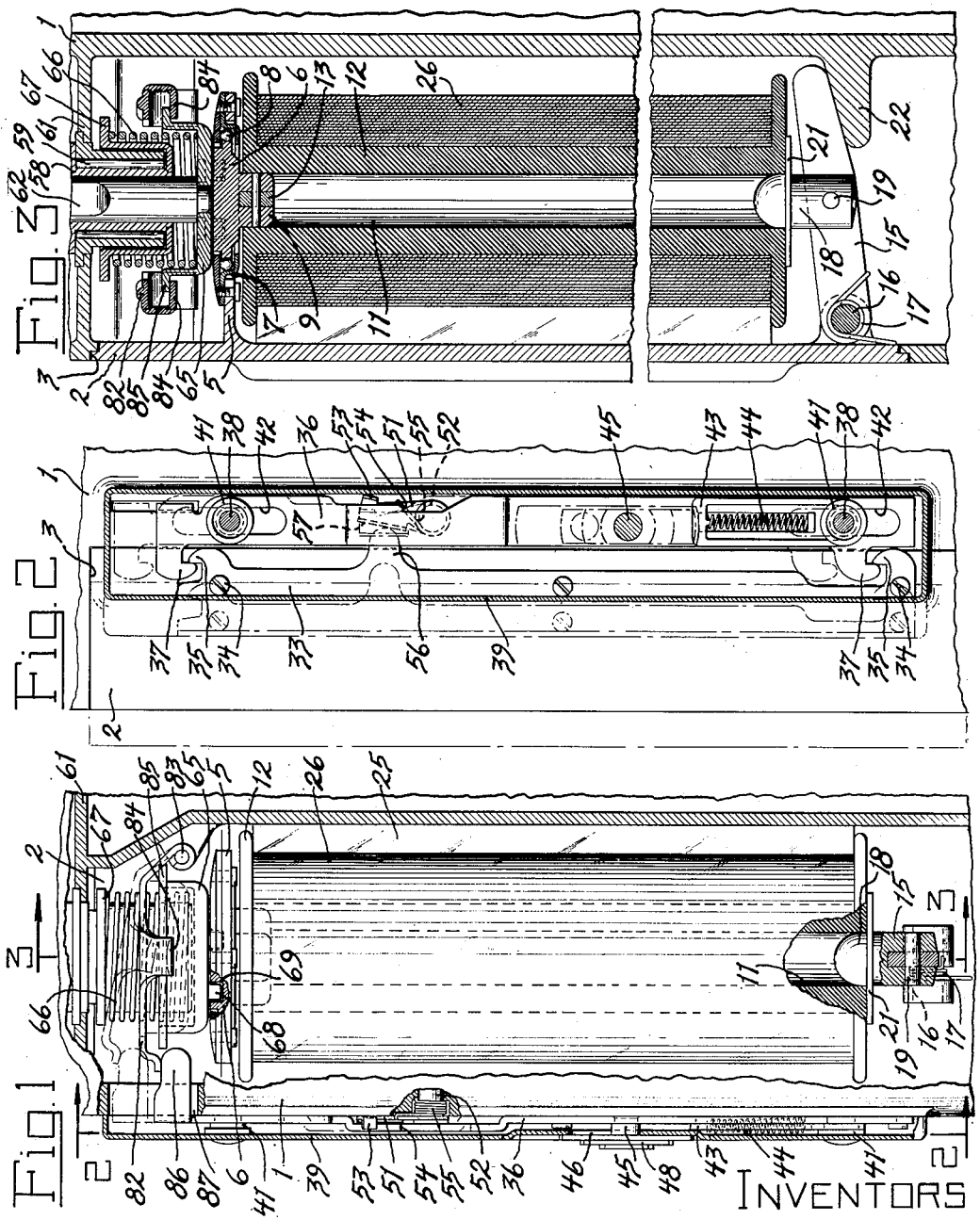
INVENTORS
LEWIS H. MOOMAW
HUGO BERNZOTT
BY Robert F. Miehle Jr.
ATTY.

Jan. 8, 1952     L. H. MOOMAW ET AL     2,581,691
PHOTOGRAPHIC CAMERA
Filed Aug. 19, 1946     2 SHEETS—SHEET 2
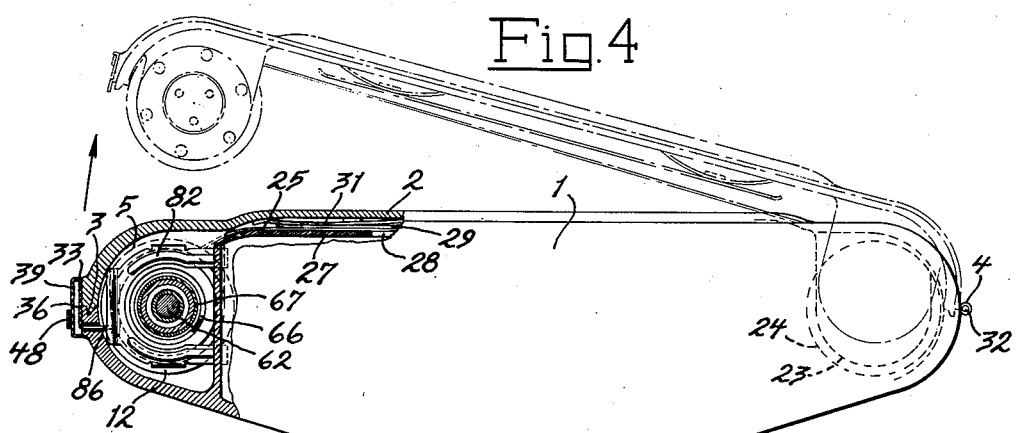
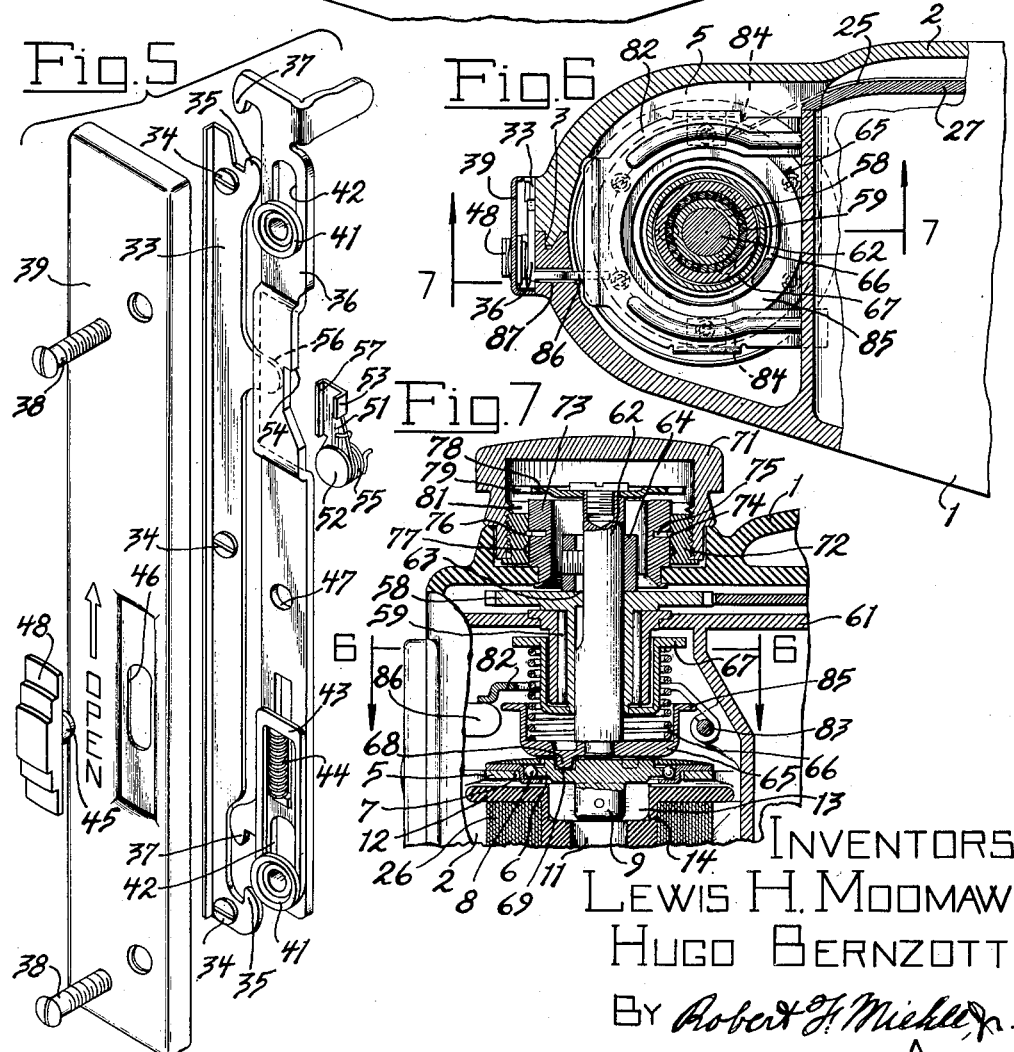
INVENTORS
LEWIS H. MOOMAW
HUGO BERNZOTT
BY Robert F. Miehle
ATTY.

Patented Jan. 8, 1952

2,581,691

UNITED STATES PATENT OFFICE 2,581,691

PHOTOGRAPHIC CAMERA

Lewis H. Moomaw, Great Neck, N. Y., and Hugo Bernzott, Niles, Ill., assignors to Bell & Howell Company, Chicago, Ill., a corporation of Illinois Application August 19, 1946, Serial No. 691,504

6 Claims. (Cl. 242—71)

Our invention relates particularly to photographic cameras of the successive exposure roll film loading type involving a casing comprising two casing parts relatively movable to open and close the casing for the installation and removal of film rolls and their film spools, one casing part, say a minor or cover casing part, carrying the film and the film spools and a film spool driving means being provided for taking up the film on the take-up spool and comprising cooperating clutch members respectively mounted on said casing parts and relatively shiftable to engage for rotating the take-up spool from the other casing part, say the main or camera mechanism carrying casing part, when the casing parts are in closed relation and to disengage to permit relative movement of the casing parts for the removal and installation of the film and the film spools, this arrangement being convenient in loading and unloading the camera and providing for the interchangeable mounting of different minor or cover casing parts, with film and film spools previously installed thereon, on the main casing part with a view toward facilitating reloading the camera.

The main object of the invention resides in the provision in a camera of the above type of a novel and effective clutch mechanism for controlling the engagement and disengagement of the aforesaid clutch members so that engagement and disengagement of the clutch members occurs automatically as an incident of opening and closing the camera casing and does not require other attention or effort. Other objects will hereinafter appear.

The invention will be better understood by reference to the accompanying drawing forming a part hereof and in which—

Figure 1 is a partial sectional view of a photographic camera embodying our invention;

Figure 2 is a partial sectional view substantially on the line 2—2 of Figure 1;

Figure 3 is a partial sectional view substantially on the line 3—3 of Figure 1;

Figure 4 is a partial top plan view of the camera with parts broken away and shown in section;

Figure 5 is an exploded perspective view of the latch mechanism of our invention;

Figure 6 is a partial sectional view substantially on the line 6—6 of Figure 7; and Figure 7 is a partial sectional view substantially on the line 7—7 of Figure 6.

Referring to the drawing, 1 and 2 designate respectively a front, main or camera mechanism carrying casing part of a camera casing, and a rear, minor or cover casing part of the camera casing which, when in closed relation with the main casing part, closes an opening 3 at the back of the main casing part, as best shown in Figures 3, 4 and 6. The casing part 2 is pivotally connected on a vertical axis at one end to the casing parts by means of a usual hinge 4 so that the casing part 2 is movable relative to the casing part 1 to open and close the casing for the installation of roll film and the spools thereof within the casing and the removal of the same therefrom. The closed relation of the casing parts is shown in full lines in Figures 1 to 4 inclusive and 6 and 7, and the partially open position of the casing part 2 relative to the casing part 1 is shown in dot and dash lines in Figures 2 and 4.

A film spool mounting is arranged interiorly of the camera casing and is carried by the casing part 2 in the region of the end thereof opposite that at which this casing part is hinged to the casing part 1, and comprises as follows:

A horizontal vertically bored support 5 is formed integrally with the casing part 2 and, being disposed adjacent the top of this casing part, projects inwardly therefrom. See particularly Figures 3 and 7. A film spool carrier 6 extends through the bore 7 of this support and is mounted on the support for rotation on a vertical axis by means of a bearing generally designated at 8. The carrier 6 is provided with a downwardly projecting axial spindle portion 9 engageable into the upper end of the axial bore 11 of a film spool 12 for carrying this end of the spool, and is provided with a diametrically disposed clutch formation 13 which is releasably engageable in a cooperating diametrical clutch slot 14 at the upper end of the spool for rotating the spool with the carrier.

An arm 15, see Figures 1 and 3, is pivotally mounted, as designated at 16, for vertical movement on the inside of the casing part 2, and is spaced below the carrier 6 and projects inwardly from this casing part, a torsion spring 17, associated with the pivotal mounting 16, being operative to actuate the arm 15 upwardly. A film spool carrier spindle 18 is mounted on the intermediate portion of the arm 15, as designated at 19, and projects upwardly from this arm. The spindle 18 is provided with an intermediate circumferential flange 21, and this spindle, being spaced below the spindle portion 9 of the carrier 6, opposes the spindle portion 9 so that the spindle portion 9 and the spindle 18 are engageable in opposite ends of the bore 11 of the spool 12 for the carrying of the film spool for rotation interiorly of the casing on an axis disposed transversely of the plane of relative movement of the casing parts, the spool being axially confined between the carrier 6 and the flange 21.

The spring 17 serves to normally maintain the engagement of the spindle portion 9 and the spindle 18 with the bore of the spool, and the spindle 18 being axially shiftable, by reason of the pivotal mounting of the arm 15, provides for releasing the spool from the film spool mounting comprising the spindle portion 9 and the spindle 18 for the interchange of film spools.

The casing part 1, see Figure 3, is provided interiorly thereof with a projection 22 which engages underneath the arm 15 when the casing parts 1 and 2 are in closed relation to positively prevent accidental axial shifting of the spindle 18 and release of a mounted film spool as might otherwise be caused by the jarring of the camera.

A second releasable film spool mounting, generally designated at 23, see Figure 4, and generally similar to the film spool mounting above described, is arranged interiorly of the camera casing, and is carried by the casing part 2 in the region of the hinged end of the casing part 2, and is adapted to releasably carry a second film spool 24 for rotation on an axis parallel to that of the film spool 12.

A photographic film 25, initially wound on the spool 24, is extended across between the spools 24 and 12 and is wound in a roll 26 on the spool 12 for the progressive exposure of the film in the camera, the spool 24 thus constituting the feed spool, and the spool 12 thus constituting the take-up spool and being rotated to progress the film. Between the spools 24 and 12, the film passes through the exposure guide of the camera, which comprises a front guide plate 27 provided with an exposure aperture 28 and carried by the casing part 1 and a rear guide plate 29 carried by the casing part 2 and spring urged forwardly by springs 31 to press the portion of the film in the guide against the front guide plate 27 and maintain it at the focal plane of the camera.

By reason of the casing part 2 carrying the film spools 12 and 24 and the rear guide plate 29, a film and its spools are carried wholly by this casing part so that a casing part 2 carrying a film and its spools may be conveniently interchanged on the casing part 1 with another casing part 2 carrying another film and its spools, thus facilitating reloading of the camera, the pivot pin 32 of the hinge 4 being removable for this purpose.

Cooperating with the hinge 4 to releasably secure the casing parts 1 and 2 in closed relation, is a latch arranged at the ends of the casing parts opposite those at which the hinge is disposed and which will now be described.

A vertically extending latch member 33 is secured by screws 34 on the casing part 2 exteriorly thereof and is provided with vertically spaced upwardly extending latch lugs 35. See particularly Figures 2 and 5. A cooperating vertically extending latch member 36 is mounted on the casing part 1 exteriorly thereof for vertical movement, as hereinafter described, and is provided with vertically spaced downwardly extending latch lugs 37 which, assuming the casing parts to be in closed relation, engage the latch lugs 35 of the latch member 33 when the latch member 36 is in its lower position, as shown in Figure 2, to secure the casing parts in closed relation, and which are disengaged from the latch lugs 35 when the latch member 36 is in its upper position, as shown in Figure 5, to permit relative movement of the casing parts out of and into closed relation.

Vertically spaced headed screws 38 are screw-threaded into the casing part 1 and, extending through a marginally flanged cover plate 39 and respectively through bored and flanged bushings 41, secure the cover plate and bushings on the casing part 1 exteriorly thereof with the bushings disposed between this casing part and the cover plate and enclosed within the enclosure provided by the flanging of the cover plate, the cover plate also enclosing the latch member 36 at all times and substantially enclosing the latch member 33 when the casing parts are in closed relation.

The latch member 36 is provided with vertically spaced and extending slots 42 which are respectively slidably engaged by the bushings 41 so that this latch member is mounted on the casing part 1 for vertical movement into and out of latching position relative to the latch member 33 of the casing part 2. A vertically disposed elongated slotted member 43 has the lower end of its slot engaged by the lower bushing 41, and a vertically disposed compression spring 44 has its upper and lower ends respectively engaged against the upper end of the member 43 and the latch member 36 and serves to actuate this latch member into its lower or latching position as shown in Figure 2. A stud 45, see particularly Figures 1 and 5, extends through a vertical slot 46 through the cover plate 39 and is secured in a hole 47 through the latch member 36, and is provided with a manipulating head 48 on the exterior of the cover plate so that the latch member 36 may be manually actuated into its upper or latch releasing position against the influence of the spring 44 for opening the camera casing.

A latch member 51, arranged between the casing part 1 and the latch member 36, is pivotally mounted on a stud 52 secured on this casing part for movement corresponding with the plane of relative movement of the casing parts and is provided with a latch lug 53 positionable in and out of engaging relation with a downwardly facing latch shoulder 54 on the latch member 36 with pivotal movement of the latch member 51. A torsion spring 55 encircles the stud 52 and, reacting on the casing part 1, serves to actuate the latch member 51 to position the latch lug 53 in engaging relation with the latch shoulder 54 to latch the latch member 36 out of latching position or in its upper position. A lug 56 on the latch member 33 of the casing part 2 projects therefrom in the direction toward the latch member 51 and is adapted to abut a flange 57 on the latch member 51, and the lug 56 and the flange 57 form a one-way abutment connection operative between the casing part 2 and the latch member 51 to actuate this latch member out of latching position, in which the latch lug 53 is out of engaging relation with the latch shoulder 54, upon final relative movement of the casing parts into closed relation.

An axially bored gear 58, disposed upwardly within the casing part 1, is rotatably mounted, as designated at 59, on a vertical axis and on a horizontal partition 61 of and disposed upwardly within this casing part, and a shaft 62 is slidably engaged in the bore of the gear 58 and is rotatably secured therewith, as designated at 63, downward movement of this shaft being limited by a collar 64 secured on the shaft and bearing downwardly on the gear 58. See particularly Figure 7. A clutch member 65 is secured on the lower end of the shaft 62 for rotation therewith, and a compression spring 66, disposed coaxially of and surrounding the shaft 62 and a flanged sleeve 67 secured with the gear 58 and bearing upwardly on this sleeve and downwardly on the clutch member 65, urges this shaft and clutch member downwardly.

When the casing parts 1 and 2 are in closed relation, the clutch member 65 is disposed above and coaxially of the carrier 6 and the film spool 12 carried on the spindle portion 9 and the spindle 18, and the clutch member 65 is provided with a downwardly projecting clutch lug 68 which is engageable downwardly into any one of a plurality of clutch recesses 69 of the carrier 6 when this clutch member and this carrier are in coaxial relation and this clutch member is moved into its lower position by the spring 66, the carrier 6 thus constituting a clutch member cooperating with the clutch member 65 for rotating the take-up spool 12 to wind the film 25 thereon, and these cooperating clutch members, which are arranged within the casing, form a part of the take-up spool driving means. Movement of the clutch member 65 and the shaft 62 to their upper position disengages the clutch member 65 from the clutch member or carrier 6 so that the casing parts 1 and 2 may be relatively moved from closed relation to open relation, and visa versa, it being observed that these cooperating clutch members are respectively carried by the casing parts 1 and 2.

The gear 58 is the final drive gear of a driving mechanism for driving the take-up spool 12 from the mechanism of the camera for automatically intermittently progressing the film as it is progressively exposed, such a driving mechanism being described and claimed in United States Letters Patent No. 2,350,693, issued June 6, 1944, on application filed by us.

A manually actuable bored knob 71, see Figure 7, is slidably and rotatably mounted on the exterior of the casing part 1 in coaxial relation with the shaft 62 by means of a bushing 72 secured in the bore of the knob and slidably and rotatably mounted on another bushing 73 secured on the upper wall of the casing part 1. A circular spring 74 is engaged in a circumferential groove 75 on the bushing 73 and expands outwardly against the bore of the bushing 72 and is alternately releasably engageable with axially spaced circular grooves 76 and 77 in the bore of the bushing 72 to predeterminately position the knob respectively in lower and upper axial positions thereof.

A clutch disk 78 is secured on the upper end of the shaft 62 within the knob 71 and is provided with peripheral clutch lugs 79, and the upper end of the bushing 72 is provided with radial clutch recesses 81. In the lower position of the knob 71, as shown in Figure 7, the clutch disk 78 is disposed above the bushing 72 so that the knob is free to rotate independently of the shaft 62 with the result that accidental rotation of the knob does not cause rotation of the take-up spool 12. In the upper position of the knob 71, the lugs 79 of the clutch disk 78 are engaged by the recesses 81 of the bushing 72 so that rotation of the knob effects rotation of the take-up spool 12 to wind the film 25 thereon, the knob being thus adapted, where the camera has an automatic film advancing mechanism, to be utilized to manually wind the leaders of the film on the take-up spool 12 without necessitating operation of the camera mechanism as incidents of loading and unloading the camera.

A bifurcated arm 82, within the casing part 1, embraces the spring 66 and has its bifurcated end pivotally mounted, as designated at 83, on this casing part and on a horizontal axis to one side of the axis of the clutch member 65 and the other end of this arm is disposed adjacent the latch member 36. See particularly Figures 1, 6 and 7. The intermediate portion of the arm 82 is provided with lugs 84 disposed in diametrically opposite relation with the clutch member 65 and underlying a circumferential flange 85 on this clutch member so that upward movement of the arm 82 effects upward movement of this clutch member against the influence of the spring 66 and out of engagement with the carrier or clutch member 6. A lug 86 on the latch member 36 extends inwardly of the casing part 1 through a vertical slot 87 through the wall thereof and underlies the adjacent end of the arm 82 to upwardly abut the same so that upward movement of the latch member 36 into its upper or latch releasing position effects upward movement of the arm and consequent upward movement of the clutch member 65 out of engagement with the carrier or clutch member 6 to permit relative movement of the casing parts out of closed relation and visa versa, the lug 86 and the arm 82 forming a one-way abutment connection so that in the event that when the casing parts are moved into closed relation and the clutch lug 68 of the clutch member 65 does not register with a clutch recess 69 of the carrier or clutch member 6, the resultant holding of the clutch member 65 in an upper position does not interfere with movement of the latch member 36 into latching position. In such case the clutch member 65 is subsequently actuated into clutching engagement with the carrier or clutch member 6 by the spring 66 when the clutch member 65 is rotated, as by the knob 71, sufficiently to register the clutch leg 68 with a clutch recess 69.

Assuming the casing parts 1 and 2 to be secured in closed relation, the latch member 36 is positioned in its lower position by the spring 44 with the latch lugs 37 engaged with the latch lugs 35 of the latch member 33, the latch member 51 is positioned against the influence of the spring 55 with the latch lug 53 out of engaging relation with the latch shoulder 54 by the lug 56 abutting the flange 57, and the clutch member 65 is positioned by the spring 66 in clutching engagement with the carrier or clutch member 6. This condition is illustrated in full lines in Figures 1 to 4 and 6 and 7.

Upon manual release of the latch member 36 from the latch member 33 by manually moving, by means of the manipulating head 48, the latch member 36 to its upper position against the influence of the spring 44, the clutch member 65 is disengaged from the carrier or clutch member 6 by the lug 86 moving the arm 82 upwardly and with it the clutch member 65 against the influence of the spring 66, and the latch member 51 is actuated by the spring 55 so that the latch lug 53 moves into engaging relation with and under the latch shoulder 54 to latch the latch member 36 in its upper position or out of latching position, this latter operation being permitted by partial separation of the casing parts. This condition is illustrated in dot and dash lines in Figures 1 and 2.

As the casing parts are moved from open relation into closed relation, the lug 56 abuts the flange 57 and actuates the latch 51 out of latching position and disengages the latch lug 53 from the latch shoulder 54 upon final relative movement of the casing parts into closed relation, whereupon the latch member 36 is moved downwardly by the spring 44 into latching position and the clutch member 65 is moved downwardly by the spring 66 into clutching engagement with the carrier or clutch member 6.

While we have thus described our invention, we do not wish to be limited to the precise details described, as changes may be readily made without departing from the spirit of our invention, but having thus described our invention, we claim as new and desire to secure by Letters Patent the following:

1. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation interiorly of said casing, film spool driving means comprising cooperating rotatable clutch members arranged interiorly of said casing and respectively carried by said casing parts and one of said clutch members being mounted on the second of said casing parts for movement to engage and disengage the other of said clutch members, a manually releasable latch operative to latch said casing parts in closed relation and including a latch member mounted on said second casing part for movement into and out of latching position, and clutch control means operative between said movable clutch member and said latch member to engage and disengage said clutch members respectively with movement of said latch member into and out of latching position.

2. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation interiorly of said casing, film spool driving means comprising cooperating rotatable clutch members arranged interiorly of said casing and respectively carried by said casing parts and one of said clutch members being mounted on the second of said casing parts for movement to engage and disengage the other of said clutch members, a manually releasable latch operative to latch said casing parts in closed relation and including a latch member mounted on said second casing part for movement into and out of latching position, clutch control means operative between said movable clutch member and said latch member to engage and disengage said clutch members respectively with movement of said latch member into and out of latching position, a second releasable latch operative on said latch member to latch the same out of latching position and including a movable latch member mounted on said second casing part for movement into and out of and spring urged into latching position, and latch releasing means including an abutment element on said first casing part and operative to actuate said second mentioned latch member out of latching position upon final relative movement of said casing parts into closed relation.

3. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation interiorly of said casing, film spool driving means comprising cooperating rotatable clutch members arranged interiorly of said casing and respectively carried by said casing parts and disposed coaxially when said casing parts are in closed relation and the clutch member which is carried by the second of said casing parts being axially shiftable to engage and disengage said clutch members and spring urged into engagement with the other clutch member, a manually releasable latch operative to latch said casing parts in closed relation and including a latch member mounted on said second casing part for movement into and out of and spring urged into latching position, clutch disengaging means operative between said latch member and said shiftable clutch member to disengage said clutch members with movement of said latch member out of latching position and comprising a one-way abutment connection, a second releasable latch operative to latch said latch member out of latching position and including a movable latch member mounted on said second casing part for movement into and out of and spring urged into latching position, and latch releasing means including an abutment element on said first casing part and operative to actuate said second mentioned latch member out of latching position upon final relative movement of said casing parts into closed relation.

4. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation interiorly of said casing on an axis disposed transversely of the plane of relative movement of said casing parts, film spool driving means comprising cooperating rotatable clutch members arranged interiorly of said casing and respectively carried by said casing parts and both being disposed coaxially of said spool axis when said casing parts are in closed relation and the clutch member which is carried by the second of said casing parts being axially shiftable to engage and disengage said clutch members, a manually releasable latch operative to latch said casing parts in closed relation and including a latch member mounted on said second casing part for movement into and out of latching position, and clutch control means operative to engage and disengage said clutch members respectively with movement of said latch member into and out of latching position and comprising a connection between said latch member and said axially shiftable clutch member.

5. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation on an axis disposed transversely of the plane of relative movement of said casing parts, film spool driving means comprising cooperating rotatable clutch members arranged interiorly of said casing and respectively carried by said casing parts and both being disposed coaxially of said spool axis when said casing parts are in closed relation and the clutch member which is carried by the second of said casing parts being axially shiftable to engage and disengage said clutch members, a manually releasable latch operative to latch said casing parts in closed relation and including a latch member mounted on said second casing part for movement into and out of latching position, clutch control means operative to engage and disengage said clutch members respectively with movement of said latch member into and out of latching position and comprising a connection between said latch member and said axially shiftable clutch member, a second releasable latch operative to latch said latch member out of latching position and including a movable latch member mounted on said second casing part for movement into and out of and spring urged into latching position, and latch releasing means including an abutment element on said first casing part and operative to actuate said second mentioned latch member out of latching position upon final relative movement of said casing parts into closed relation.

6. In a photographic camera, the combination with a casing comprising two casing parts relatively movable to open and close said casing for the installation and removal of a film spool, of a film spool mounting arranged interiorly of said casing and carried by a first of said casing parts and adapted to releasably carry a film spool for rotation on an axis disposed transversely of the plane of relative movement of said casing parts, film spool driving means comprising cooperating rotatable clutch members arranged interiorly of said casing and respectively carried by said casing parts and both being disposed coaxially of said spool axis when said casing parts are in closed relation and the clutch member which is carried by the second of said casing parts being axially shiftable to engage and disengage said clutch members and spring urged into engagement with the other clutch member, a manually releasable latch operative to latch said casing parts in closed relation and including a latch member carried by said second casing part and movable in parallelism with said spool axis into and out of and spring urged into latching position, clutch disengaging means operative between said latch member and said shiftable clutch member to disengage said clutch members with movement of said latch member out of latching position and comprising a one-way connection, a second releasable latch carried with said second casing part and operative to latch said latch member out of latching position and including a latch member mounted on said second casing part for movement into and out of latching position in correspondence with relative movement of said casing parts and spring urged into latching position, and latch releasing means including an abutment element on said first casing part and operative to actuate said second mentioned latch member out of latching position upon final relative movement of said casing parts into closed relation.

LEWIS H. MOOMAW.
HUGO BERNZOTT.

REFERENCES CITED

The following references are of record in the file of this patent:

UNITED STATES PATENTS

| Number | Name | Date |
|---|---|---|
| 1,196,601 | Smeby | Aug. 29, 1916 |
| 2,350,693 | Moomaw et al. | June 6, 1944 |